United States Patent
Lhermitte

(10) Patent No.: US 10,454,601 B2
(45) Date of Patent: Oct. 22, 2019

(54) METHOD FOR PROCESSING AN ORIGINAL GLOBAL STREAM INCLUDING AT LEAST ONE PHYSICAL LAYER TUNNEL ENCAPSULATING A TRANSPORT STREAM

(71) Applicant: ENENSYS TECHNOLOGIES, Cesson-Sevigne (FR)

(72) Inventor: Richard Lhermitte, Rennes (FR)

(73) Assignee: ENENSYS TECHNOLOGIES, Cesson-Sevigne (FR)

(*) Notice: Subject to any disclaimer, the term of this patent is extended or adjusted under 35 U.S.C. 154(b) by 0 days.

(21) Appl. No.: 15/579,001

(22) PCT Filed: May 31, 2016

(86) PCT No.: PCT/EP2016/062295
§ 371 (c)(1),
(2) Date: Dec. 1, 2017

(87) PCT Pub. No.: WO2016/193269
PCT Pub. Date: Dec. 8, 2016

(65) Prior Publication Data
US 2018/0145776 A1 May 24, 2018

(30) Foreign Application Priority Data
Jun. 1, 2015 (FR) .................................... 15 54936

(51) Int. Cl.
*H04L 5/00* (2006.01)
*H04H 20/10* (2008.01)
(Continued)

(52) U.S. Cl.
CPC .......... *H04H 20/103* (2013.01); *H04H 20/67* (2013.01); *H04L 12/4633* (2013.01); *H04N 21/23608* (2013.01)

(58) Field of Classification Search
CPC .. H04H 20/103; H04H 20/67; H04L 12/4633; H04N 21/23608
See application file for complete search history.

(56) References Cited

U.S. PATENT DOCUMENTS

| 9,148,607 B2 | 9/2015 | Lhermitte et al. | |
|---|---|---|---|
| 2011/0103300 A1* | 5/2011 | Vare | H04N 21/6112 370/328 |
| 2017/0026432 A1* | 1/2017 | Park | H04L 1/0071 |

FOREIGN PATENT DOCUMENTS

| EP | 2574054 A1 | 3/2013 |
|---|---|---|
| FR | 2932037 A1 | 12/2009 |

(Continued)

OTHER PUBLICATIONS

Tommy Jensen: "Local Content in DVB-T2 Systems With SFN", International Broadcasting Conference 2012; Sep. 12, 2012-Sep. 17, 2012; Amsterdam, Sep. 12, 2012 (Sep. 12, 2012), XP030082400.
(Continued)

*Primary Examiner* — Lan-Huong Truong
(74) *Attorney, Agent, or Firm* — David D. Brush; Westman, Champlin & Koehler, P.A.

(57) ABSTRACT

A method for processing an original total stream delivering a modified total stream, the original total stream being sent out by a head-end and addressed to a plurality of broadcasting sites, and including at least one physical layer pipe encapsulating a transport stream. The method includes receiving the original total stream, and for at least one physical layer pipe of the original total stream, called an original pipe: extracting the transport stream encapsulated in the original pipe, called an original transport stream; obtaining a modified transport stream by replacing at least one main content carried by the original transport stream by at least one secondary content; time-shifting the original total stream; aligning the modified transport stream with the original total stream obtained after time shift; and replacing, in the original pipe, the original transport stream by the modified transport stream.

12 Claims, 4 Drawing Sheets

Figure 1:
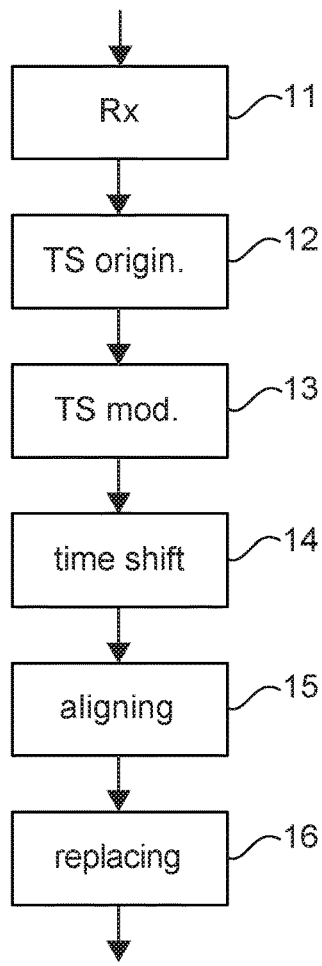

(51) Int. Cl.
*H04H 20/67* (2008.01)
*H04L 12/46* (2006.01)
*H04N 21/236* (2011.01)

(56) References Cited

FOREIGN PATENT DOCUMENTS

| FR | 2963864 A1 | 2/2012 |
|---|---|---|
| WO | 2016166214 A1 | 10/2016 |

OTHER PUBLICATIONS

International Search Report dated Aug. 15, 2016 for corresponding International Application No. PCT/EP2016/062295, filed May 31, 2016.
English translation of the Written Opinion dated Oct. 5, 2017 for corresponding International Application No. PCT/EP2016/062295, filed May 31, 2016.
Russian Office Action dated Jun. 14, 2019 for corresponding Russian Application No. 2017145460/07 filed May 31, 2016.
English translation of the Russian Office Action dated Jun. 14, 2019 for corresponding Russian Application No. 2017145460/07 filed May 31, 2016.

\* cited by examiner

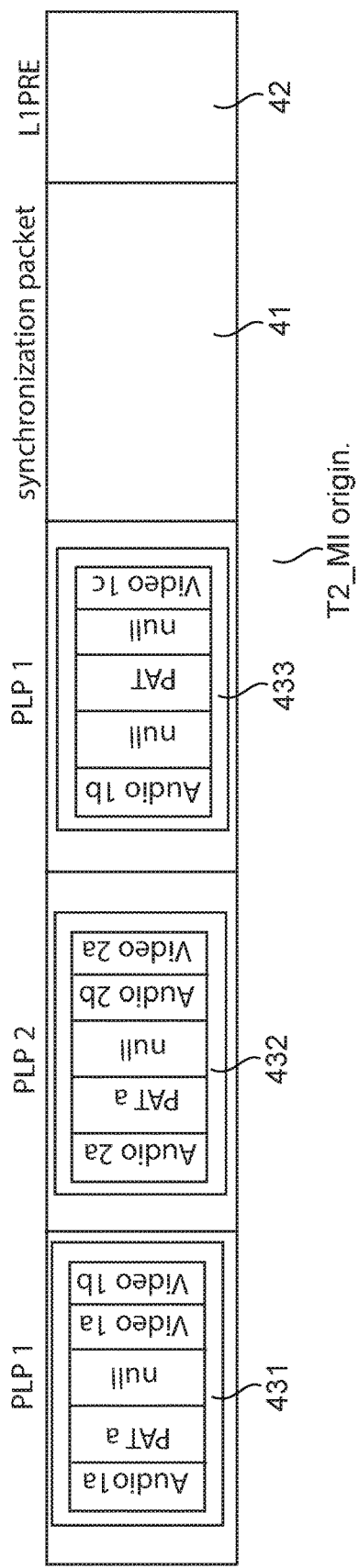
Fig.4A
Fig.4B
Fig.4C

METHOD FOR PROCESSING AN ORIGINAL GLOBAL STREAM INCLUDING AT LEAST ONE PHYSICAL LAYER TUNNEL ENCAPSULATING A TRANSPORT STREAM

CROSS-REFERENCE TO RELATED APPLICATIONS

This Application is a Section 371 National Stage Application of International Application No. PCT/EP2016/062295, filed May 31, 2016, which is incorporated by reference in its entirety and published as WO 2016/193269 A1 on Dec. 8, 2016, not in English.

1. FIELD OF THE INVENTION

The field of the invention is that of the broadcasting of information, especially the terrestrial broadcasting of television services, in a broadcasting network comprising a head-end and a plurality of broadcasting sites.

More specifically, the invention relates to the modification of a total stream (i.e. a stream comprising one or more physical layer pipes each encapsulating a transport stream), enabling especially the replacement of a main content carried by a transport stream of the total stream (for example national television services such as the TF1®, France 2® and other channel) by a secondary content (for example a local content of the local weather, local newspaper, local advertisements and other types).

The invention can be applied especially to terrestrial broadcasting networks compliant with the DVB-T (Digital Video Broadcasting-Terrestrial) standards or future standards. In particular, the invention can be applied to the SFN (Single Frequency Network).

2. PRIOR ART

During digital terrestrial broadcasting, all the channels associated with a multiplex/frequency are managed in a centralized manner in a piece of equipment commonly called a head-end in order to create a unique signal for all the broadcasting sites (i.e. re-transmission stations) implanted in distinct geographical sites. The distribution path used between the head-end and the broadcasting sites is generally a satellite link but can also be an IP or microwave type link.

The standard most used at present to broadcast digital terrestrial television is the DVB-T standard. This standard is independent of the format of the content: for example it enables the broadcasting of "normal" services as well as "high definition" services.

A second version of the DVB-T standard, called DVB-T2, offers even greater efficiency in terms of broadcasting, coverage, transport capacity (bit rate) and flexibility.

This second version enables the aggregation within a same total stream of several physical layer pipes called PLPs. Each of these physical layer pipes consists of a multiplex of contents in an MPEG-2 TS type transport stream having available its own modulation parameters. These pipes are brought together within a total stream called the T2-MI (Modulator Interface). The T2-MI stream is itself encapsulated in a new MPTS (Multiple Program Transport Stream) type layer. The T2-MI stream comprises T2-MI packets, such as synchronization packets ("T2-MI timestamp packets"), signaling packets (including the packet called the T2-MI L1 current that gives information on the structure of the T2-MI stream) and packets called baseband frames containing MPEG-2 TS stream data from the different pipes. The T2-MI packets are organized in T2 frames, each T2 frame comprising a T2-MI timestamp packet, a T2-MI L1 current packet and baseband frame packets.

Besides, in digital terrestrial broadcasting, SFN technology is conventionally used to improve the coverage of the territory/geographical zone and make up for shadow zones related to elements that are disruptive in transmission (mountains, hills, valleys, large buildings etc.). It also reduces the number of frequencies used and therefore releases certain ranges of frequencies.

This SFN technology which is highly efficient implies perfect synchronizing of the broadcasting sites with each other and a strictly identical structure of the content to be broadcast by the different broadcasting sites.

It may also be recalled that in digital terrestrial television, breaking (or "switching" or "cutaway" enables a main content, such as a televised national coverage program on the French France 3® channel, to be replaced by a secondary content such as a televised program of regional coverage on France 3. There is thus a switch from broadcasting by a national head-end of the main content to a regional broadcasting site broadcasting secondary content.

The problems related to breaking are well known in the field of digital terrestrial television broadcasting according to the DVB-T standard.

However, there are few efficient techniques of breaking in the field of digital terrestrial television broadcasting according to the DVB-T2 that make it possible especially to ensure SFN broadcasting.

3. SUMMARY OF THE INVENTION

The invention thus proposes a novel solution for the replacement of contents that is compatible with the DVB-T2 standard or other digital terrestrial broadcasting standards, and which, according to at least one embodiment, ensure SFN broadcasting.

To this end, the invention proposes a method for processing an original total stream delivering a modified total stream, according to which said original total stream is emitted by a head-end and addressed to a plurality of broadcasting sites, and comprises at least one physical layer pipe encapsulating a transport stream.

According to the invention, such a method implements the following steps:
  receiving the original total stream,
  for at least one physical layer pipe of the original total stream, called an original pipe:
    extracting the transport stream encapsulated in the original pipe, called an original transport stream,
    obtaining a modified transport stream obtained by replacing at least one main content carried by the original transport stream by at least one secondary content,
    time-shifting the original total stream,
    aligning at least one reference packet of the modified transport stream with at least one reference packet of the original total stream obtained after time shift, and
    replacing, in the original pipe of the original total stream obtained after time shift, the original transport stream by the modified transport stream obtained after alignment.

At the end of these different steps, the modified total stream is obtained.

The invention thus proposes a novel solution for the processing of a total stream enabling the modification of such a total stream for the "breaking" of television services.

According to the proposed solution, a total stream is sent by a head-end to a plurality of broadcasting sites. Such a total stream is for example of a T2-MI type according to the DVB-T2 standard or the like. A device for processing a total stream, located between the head-end and the broadcasting sites, for example at each broadcasting site or at each region or a SFN cell cluster, receives the original total stream, modifies it and generates a modified total stream.

To this end, one or more transport streams encapsulated in the original total stream are extracted from the original total stream and the main content or contents carried by this transport stream or these transport streams are replaced by secondary contents. Replacing the content is therefore done at the transport streams level and not at the total stream level. After re-encapsulation of the transport streams, the reconstructed total stream, also called the modified total stream, has a structure identical to the original total stream especially in terms of number of packets but carries a different content. In other words, such a technique for processing the total stream enables the duplication or identical reconstruction of a total stream, in terms of structure and number of packets, deterministically while at the same time enabling the modification of the content. In this way, the replacement of contents is transparent for the broadcasting site.

It can be noted that the steps of time shift and alignment implemented prior to the replacement of the original transport stream by the modified transport stream make it possible to compensate for the processing time needed to modify certain transport streams.

In particular, the step for time-shifting the original total stream delays the original total stream, for example by storing it in a buffer memory for a duration at least equal to the processing time needed to replace the contents in the transport streams.

Looking at the context of the DVB-T2 broadcasting standard, the original total stream can be delayed by a duration corresponding to the processing time (for example of the order of 100 ms) needed to replace contents in the transport streams, to which the period of one T2 frame (for example of the order of 250 ms) is added.

In particular, in the context of the DVB-T2 broadcasting standard, the original total stream and the modified total stream are of the T2-MI type. The original total stream and the modified total stream have an identical structure in the sense that they both carry the same synchronization packets, the same signaling packets and the same number of baseband frames. Only the data of the MPEG-2TS transport stream of the different pipes differ between the original total stream and the modified total stream.

Such a technique for processing the total stream according to the invention brings numerous advantages.

In particular, the proposed solution does not require any modification of the total stream at the head-end.

Thus, such a technique for processing the total stream avoids the duplication of the television contents/service during the broadcasting from the head-end towards the broadcasting sites, and therefore optimizes the distribution links. In particular, the invention avoids the need to have as many distribution networks as there are SFN regions/cell clusters and is independent of the distribution paths between the head-end and the broadcasting sites (satellites, IP, etc.).

Since the technique for processing the total stream is implemented in a device for processing the total stream associated with at least one broadcasting site, it offers flexibility in the architecture of the network with the possibility of managing local contents in different broadcasting sites not linked to each other.

One particular embodiment uses the DVB-T2 technology without adding any proprietary solution thereto. It is therefore compatible with all the possible configurations of the DVB-T2 standard (mono and multi-PLP, SFN, MISO, etc.).

According to at least one embodiment, the proposed solution enables the insertion of a "local" content into one or more national TV services (local breaking, local advertisements, etc.) by using for example the DVB-T2 broadcasting technology while at the same time guaranteeing the SFN mode.

The fact is that, since the "reconstruction" of the total stream is deterministic, the proposed solution enables compliance with the synchronization constraints of the SFN mode. The different broadcasting sites (i.e. re-broadcasting stations) of a cell cluster (i.e. SFN cell) can thus send out a frequency-synchronized signal and above all a time-synchronized signal exactly, with a precision of the order of 1 to 10 µs.

In particular, the reference packets used for the alignment sub-step are signaling packets, for example PAT (Program Association Table) type tables according to the DVB/DVB-T2 standard.

Indeed, such reference packets are not modified during the replacement of the contents in a modified transport stream, and can therefore be used to align the modified transport stream with the original total stream encapsulating the original transport stream.

According to one particular embodiment of the invention, the method of processing comprises a step for updating at least one check field in the modified total stream.

Looking at the context of the DVB-T2 broadcasting standard, such check fields, denoted as CRC, are present for each T2-MI packet. According to this embodiment, the CRC of the T2-MI packets and the CRC of the baseband frames containing the data of the modified transport stream are updated so as to take account of the replacement of contents.

According to a first embodiment of the invention, the step for obtaining implements the transmission of the original transport stream to a piece of equipment for replacing contents that replaces the main content or contents with one or more secondary contents, and the reception of the modified transport stream.

For example, such a piece of equipment for replacing is an existing product for the replacement of contents according to the DVB-T, DVB-T2 or equivalent broadcasting standard, developed by an equipment provider.

According to a second example, such a piece of equipment for replacing implements the method for replacing contents described in the French patent application no. 1553260 filed on 14 Apr. 2015.

Indeed, the extraction of the transport streams from the original total stream according to the invention enables the replacement of contents at the transport streams level (and not at the total stream level) thus enabling the use of content replacement equipment developed according to the DVB-T broadcasting standard.

According to a second embodiment of the invention, the step for obtaining implements the replacement of the main content or contents by the secondary content or contents.

In other words it is the device for processing the total stream itself that implements the replacement of the main content or contents by the secondary content or contents.

To this end, such a device implements for example the method for replacing contents described in the French patent application no. 1553260 cited here above.

In particular, such a replacing implements a replacing of at least one data packet associated with the main content of the original transport stream, by at least one data packet associated with the secondary content (corresponding for example to a local transport stream).

In one particular embodiment, the different steps of the method for processing a total stream according to the invention are determined by computer program instructions.

The invention is therefore also aimed at protecting a computer program comprising instructions adapted to implementing steps of the method for processing a total stream as described here above when this program is executed by a processor, as well as a computer-readable information medium comprising instructions of a computer program as mentioned here above.

The invention also relates to a device for processing a corresponding total stream.

Such a device is especially suited to implementing the method for processing a total stream described here above.

Such a device could of course comprise the different characteristics pertaining to the method for processing a total stream according to the invention that can be combined or taken in isolation. Thus, the characteristics and advantages of this device are the same as those of the method for processing a total stream. They are therefore not described in more ample detail.

According to one particular embodiment of the invention, the secondary content or contents are stored preliminarily in the processing device or in a piece of equipment for replacing contents communicating with the processing device.

In particular, such a device can be located in each SFN region/cell cluster (several broadcasting sites belonging to a same SFN type cell cluster) or else at each broadcasting site. This is for example a T2-Edge® type of equipment commercially distributed by the applicant.

4. LIST OF FIGURES

Figure 5:
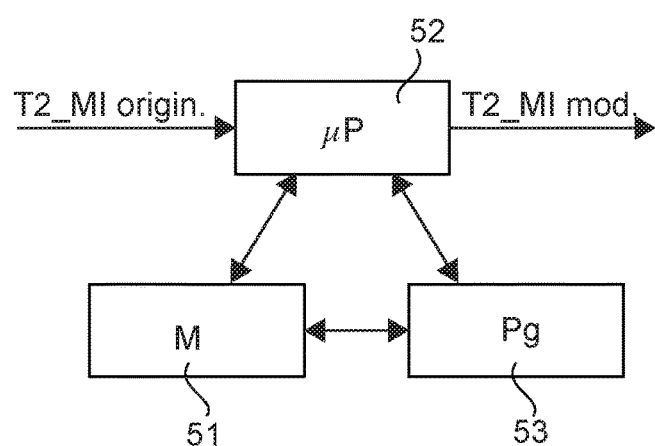
Figure 2:
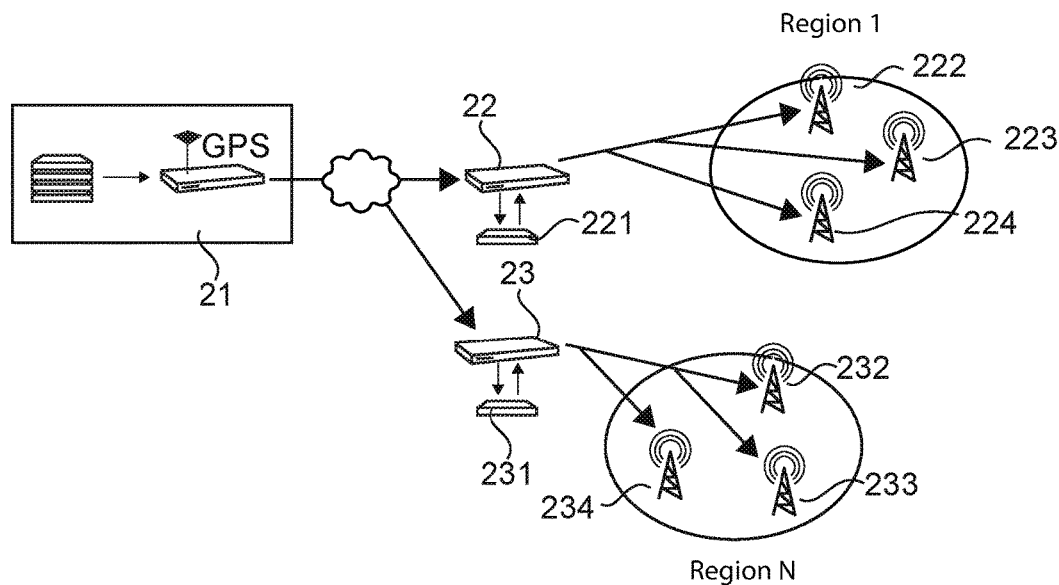
Figure 3:
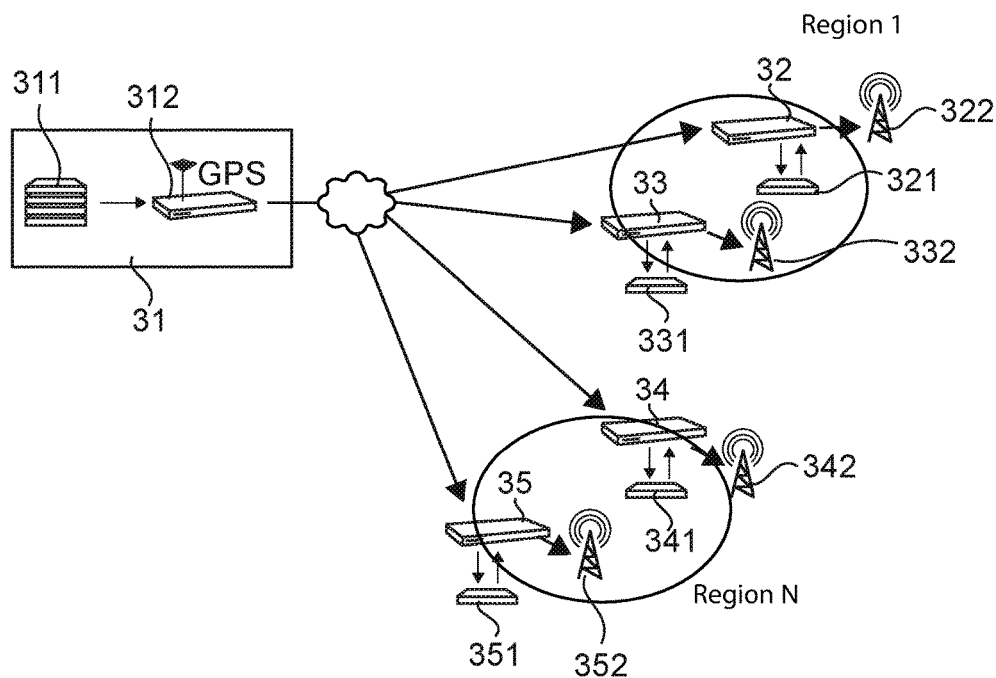

Other features and advantages of the invention shall appear more clearly from the following description of a particular embodiment given by way of a simple illustratory and non-exhaustive example and from the appended figure of which:

FIG. 1 presents the main steps of a method for processing a total stream according to one particular embodiment of the invention;

FIGS. 2 and 3 illustrate two examples of broadcasting networks applying devices for processing a total stream according to one particular embodiment of the invention;

FIGS. 4A to 4E respectively represent examples of an original total stream, an original transport stream, a modified transport stream, the alignment of the modified transport stream with the original total stream, and a modified total stream;

FIG. 5 presents the simplified structure of a device for processing a total stream according to one particular embodiment of the invention.

5. DESCRIPTION OF ONE EMBODIMENT OF THE INVENTION 5.1 General Principle

The general principle of the invention relies on the deterministic processing of a total stream sent out by a head-end and addressed to a plurality of broadcasting sites, enabling the generation of a modified total stream having a structure identical to that of the original total stream and having a content that is modified compared to the original total stream.

The proposed solution relies on the extraction of the transport stream or streams encapsulated in the original total stream, the deterministic replacement of the contents at the transport stream level, then the deterministic reconstruction of a total stream, called a modified total stream, having a structure identical to that of the original total stream.

FIG. 1 presents the main steps implemented for the processing of a total stream according to one embodiment of the invention, enabling the replacement of at least one main content carried by a transport stream of an original total stream (for example a national audio video service to be replaced) by at least one secondary content, possibly carried by a "local" transport stream (for example one or more local advertisements).

The term "main content" or "secondary content" is understood here to mean an audio visual content comprising at least one video, audio and/or subtitle type component. Each component is transmitted in the transport stream in the form of multiplexed packets. The video, audio, and/or subtitle packets of the main content respectively describe the video, audio, and/or subtitle component of the main content. The video, audio, or subtitle packets of the secondary content respectively describe the video, audio and/or subtitle component of the secondary content.

Here below, we consider an original total stream issued by a head-end and addressed to a plurality of broadcasting sites (i.e. re-transmission stations). The steps presented with reference to FIG. 1 can be implemented by a processing device located between the head-end and at least one of the broadcasting sites.

During a first step 11, the processing device receives the original total stream. Such an original total stream comprises at least one physical layer pipe, each physical layer pipe encapsulating a transport stream.

For at least one physical layer pipe of the original total stream, called an original pipe, the transport stream encapsulated in this original pipe is extracted during a second step 12. The transport stream thus extracted is called an original transport stream.

In a third step 13, a modified transport stream is obtained from the original transport stream. Such a modified transport stream is obtained by replacing at least one main content, carried by the original transport stream, by at least one secondary content, possibly carried by a "local" transport stream. Such a replacement can be implemented by the processing device of the total stream or by a specific piece of equipment for replacing specific contents, preserving the structure of the transport stream, i.e. not modifying the number of packets of the transport stream between two signaling packets. Such a processing device or piece of equipment for replacing carries out the insertion deterministically.

The original total stream is then time-shifted in a fourth step 14, for example, by having it stored it in a buffer memory, and the modified transport stream is aligned with the time-shifted original total stream during a fifth step 15 by aligning at least one reference packet of the modified transport stream with at least one reference packet of the time-shifted original total stream.

During a sixth step 16, a modified total stream is reconstructed, by replacing the original transport stream by the modified transport stream in the original pipe of the time-shifted original total stream. The content of the original pipe is modified since the original pipe henceforth encapsulates the modified transport stream.

As indicated here above, such a processing can be implemented by a processing device located between the head-end and at least one of the broadcasting sites.

FIGS. 2 and 3 illustrate two examples of broadcasting networks comprising one or more devices for processing a total stream capable of implementing the processing method described here above.

According to a first example illustrated in FIG. 2, the device for processing a total stream can be located in each SFN region/cell cluster.

According to this first example, the head-end 21 generates an original total stream and broadcasts it to the processing devices 22 and 23 by means of a distribution path. Each processing device 22, 23 can be connected to a content server or to a database storing the secondary contents to be broadcast, or to a piece of equipment for replacing contents 221, 231 itself connected to a content server or to a database storing the secondary contents to be broadcast. The processing device 22 (and 23 respectively) receives the original total stream, modifies the content of at least one transport stream of the original total stream and transmits the modified total stream to one or more broadcasting sties 222, 223, 224 (respectively 232, 233, 234) implanted in distinct geographical sites. Each broadcasting site comprises a receiver and re-transmitter which can, if necessary, be combined. The term "broadcasting site" is understood here to mean a piece of equipment or a system comprising a receiver followed by a modulator/transmitter or integrated into a modulator/transmitter.

According to a second example illustrated in FIG. 3, the device for processing a total stream can be located at a broadcasting site.

According to this second example showing better performance in terms of bandwidth, the head-end 31 generates an original total stream and broadcasts it to the processing devices 32, 33, 34 and 35 by means of a distribution path. Each processing device 32, 33, 34, and 35 can be connected to a content server or to a database storing the secondary contents to be broadcast or to a content replacement piece of equipment 321, 331, 341, 351 itself connected to a content server or to a database storing the secondary contents to be broadcast. Each processing device (32, 33, 34, 35 respectively) receives the original total stream, modifies the content of at least one transport stream of the original total stream and transmits the modified total stream to the broadcasting site with which it is associated (322, 332, 342, 352 respectively). In particular, the processing device can be integrated with the broadcasting site with which it is associated. In this case, the modified total stream does not have to be transmitted to the broadcasting site. It is to be recalled that each broadcasting site is implanted in a different geographical site and comprises at least one receiver followed by a modulator/transmitter or integrated into a modulator/transmitter.

5.2 Example of Implementation

There follow here below a description of an exemplary implementation of the invention in a broadcasting network according to FIG. 3, comprising a head-end 31 and devices for processing a total stream 32, 33, 34, 35 located at each broadcasting site 322, 332, 342, 352.

The context here is also that of a DVB-T2 type broadcasting standard, according to which the original total stream is of a T2-MI type and each transport stream is encapsulated in a physical layer pipe.

According to this example, the head-end 31 works classically, by aggregating the national contents 311 and by creating, through a T2 gateway 312, a total stream intended for being conveyed to all the broadcasting sites. The T2 gateway 312 enables the adaptation of the content to the DVB-T2 format. To this end, inter alia, it encapsulates the national contents in a T2-MI total stream in order to be able to transport them up to the broadcasting sites. It also inserts information on the setting of the SFN network (SFN synchronization packets for example of the DVB-T2 timestamp type also called the "T2-MI timestamp").

FIG. 4A illustrates an example of an original total stream, denoted as T2-MIorigin, issued by the head-end 31.

A frame T2 of the original total stream comprises for example a synchronization packet 41 (T2-MI timestamp), a signaling packet 42 ("L1PRE") and baseband frame packets 431, 432, 433 carrying the data of the transport streams of the different pipes. For example, the baseband frames 431 and 433 carry the packets of a first transport stream encapsulated in the physical layer pipe PLP1 and the baseband frame 432 carries the packets of a second transport stream encapsulated in the physical layer pipe PLP2.

The original total stream issued by the head-end 31 is a reference signal that can be modified locally at each broadcasting site by the insertion of local contents. The distribution of this original total stream is done simultaneously towards all the broadcasting sites.

Each processing device of a total stream 32, 33, 34, 35 located in a broadcasting site according to this example of implementation of the invention therefore receives the original total stream T2-MI.

At least one of the processing devices 32, 33, 34, 35 implements a processing of the original total stream to modify its content. In this example it is assumed that the original total stream encapsulates two physical layer pipes, each associated with a distinct transport stream and that it is sought to replace a service formed by a video component and an audio component of the first transport stream. This is a purely illustrative and non-exhaustive example, and a service could, for example, consist of several video, audio and/or subtitle type components, and one or more transport streams of the original total stream could be modified.

For example, the processing device 32 receives the original total stream in the T2-MI format and analyses it to separate the different elements forming the original total stream: the different physical layer pipes (PLP1, PLP2), the signaling packet (L1PRE), the SFN synchronization packets (T2-MI timestamp).

For at least one layer pipe, the processing device 32 extracts the content provided in the PLP. For example, the processing device 32 extracts the packets from the first transport stream encapsulated in the physical layer pipe PLP1, carried by the baseband frames 431 and 433.

The first transport stream thus obtained is formed by audio packets, video packets, signaling packets (for example PAT tables) and null packets. It is illustrated in FIG. 4B and denoted as TS1origin, for first original transport stream.

The first original transport stream is then modified by replacing at least one main content carried by this stream by at least one secondary content.

As already indicated, this modification of the transport stream or streams can be implemented by a method or by equipment for replacing contents/local insertion, distinct from the processing device, preserving the structure of the transport stream, i.e. not modifying the number of packets of the transport stream between two signaling packets. According to another embodiment, this modification of the transport stream or streams can be implemented by the processing device itself.

Such a method, processing device or such replacement equipment carries out the insertion deterministically.

For example, such a method, processing device or replacement equipment implements a content replacing technique such as that described in the French patent application no. 1553260 mentioned here above, relying on a particular updating of the different fields of the transport stream (reference clock, continuity counters, reconstruction time information etc.) used to modify only the transport stream and not the video, audio or subtitle type elementary streams. Such a method implements the following steps in at least one piece of content replacement equipment associated with at least one of the broadcasting sites:

determining an instant of video breaking and at least one instant of audio of subtitle breaking, from at least one breaking packet of the original transport stream, replacement, in the original transport stream, of:
  at least one video packet or a null packet of the main content, called a video packet to be replaced, by at least one video packet of the secondary content or by a null packet, called a replacement video packet, starting from the video breaking instant, and
  at least one audio or subtitle packet or a null packet of the main content, called an audio or subtitle packet to be replaced, by at least one audio packet or subtitle packet of the secondary content or by a null packet, called a replacement audio or subtitle packet, starting from the audio or subtitle breaking instant or instants, delivering a modified stream, updating, in the modified transport stream of:
  a reference clock,
  a continuity counter of video packets and at least one video reconstruction temporal information in the replacement video packet or packets, and
  a continuity counter of audio or subtitle packets and at least one audio or subtitle reconstruction temporal information in the replacement audio or subtitle packet or packets, taking account of the video reconstruction temporal information.

The processing device 32 then obtains a first modified transport stream, denoted as TS1mod in which some packets of the first original transport stream (audio, video, or null packets) have been replaced by other packets (audio, video or null packets) corresponding for example to a local advertisement. The first transport stream thus modified is illustrated in FIG. 4C.

When the processing device 32 has received the first modified transport stream TS1mod, it can replace the first original transport stream by the first modified transport stream in the physical layer pipe PLP1. The physical layer pipe PLP1 therefore henceforth encapsulates the modified transport stream TS1mod.

More specifically, it is proposed according to one particular embodiment of the invention to put the original total stream in a buffer memory for at least the time needed to modify the first transport stream. For example, the original total stream is delayed by a duration equal to the processing time for the local deterministic insertion to which we add the period of a T2 frame. The different transport stream or streams and the original total stream are then realigned to compensate for the processing time of the equipment carrying out the modification of the total stream. According to the present example, at least one reference packet of the first modified transport stream is aligned with at least one reference packet of the original total stream.

Figure 4D:
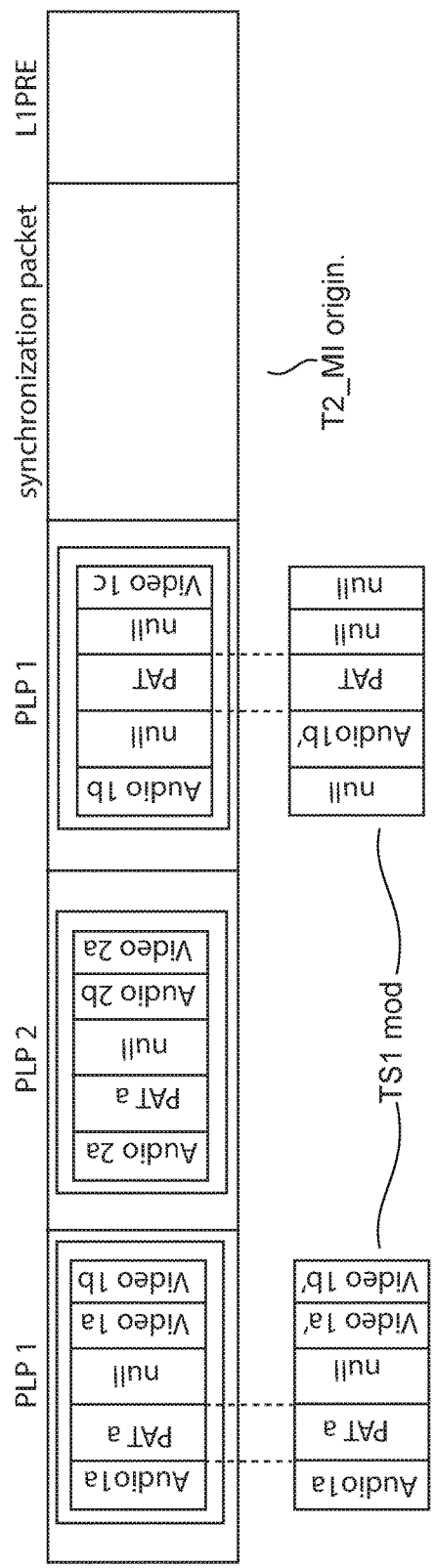

FIG. 4D illustrates the alignment of the reference packets of the first modified transport stream, for example PAT-table-type signaling packets, with corresponding packets in the original total stream.

The modified transport stream can then be reinserted deterministically and identically into the T2-MI packets of the baseband frame type composing the corresponding physical layer pipe. In other words, the first original transport stream is replaced by the first modified transport stream in the physical layer pipe PLP1 so as to obtain a modified total stream denoted as T2-MI mod.

Figure 4E:
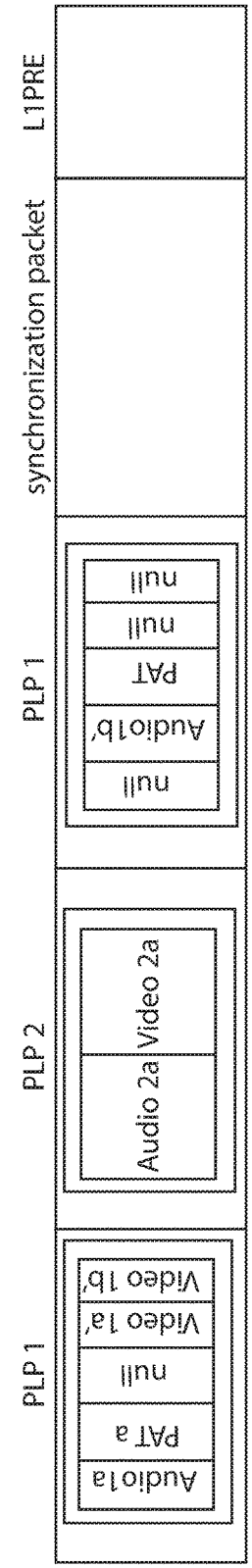

FIG. 4E illustrates an example of a modified total stream obtained according to this embodiment of the invention.

The check fields (CRC) of the T2-MI packets and of the baseband frames can then be updated. In particular, the check fields of the T2-MI packets and of the baseband frames associated with the physical layer pipe PLP1 encapsulating the modified transport stream or streams are updated.

The modified total stream, illustrated in FIG. 4E, and the original total stream, illustrated in FIG. 4A, have a similar structure. In particular, the synchronization ("T2-MI timestamp") packets 41 and signaling ("L1PRE") packets 42 are identical between the two total streams. The difference between these two total streams is based on the content carried by at least one of the transport streams: in the original total stream, the physical layer pipe PLP1 encapsulates the first original transport stream (i.e. carrying at least one main content) while, in the modified total stream, the physical layer pipe PLP1 encapsulates the first modified transport stream (i.e. carrying at least one secondary content).

The CRC fields also differ between the two total streams since they are updated to take account of the modifications made to the transport stream or streams.

According to at least one embodiment, the invention therefore enables the duplication of type T2-MI stream while at the same time modifying its content at the transport stream level, in replacing the transport stream packets encapsulated in at least physical layer pipe of the T2-MI stream. In particular, the invention according to at least one embodiment ensures the SFN preservation since the synchronization packets of the modified total stream are identical to those of the original total stream.

In particular, it can be noted that a different content can be inserted in the different processing devices. Thus, each processing device can deliver a different modified total stream while the original total stream is identical for the different processing devices. Similarly, each physical layer pipe of the original total stream is processed separately. Thus, the transport streams encapsulated in different pipes of the original total stream can be replaced by different transport streams in the modified total stream.

5.3 Structure of a Device for Processing a Total Stream

Referring finally to FIG. 5, we present the simplified structure of device for processing a total stream implementing the method for processing a total stream according to the particular embodiment described here above.

Such a device comprises a memory 51, for example a buffer memory, a processing unit 52 equipped for example with a microprocessor µP and driven by the computer program 53 implementing the method for processing a total stream according to at least one embodiment of the invention.

At initialization, the code instructions of the computer program 53 are for example loaded into a RAM and then executed by the processor of the processing unit 52. The processing unit 52 inputs an original total stream. The microprocessor of the processing unit 52 implements the steps of the processing method described here above, according to the instructions of the computer program 53, to modify the content of at least one transport stream encapsulated in a physical layer pipe of the original total stream. To this end, the processing device of an original total stream also comprises a module for receiving the original total stream, and the following modules, activated for at least one physical layer pipe of the original total stream, called an original pipe:

- a module for the extraction of the transport stream encapsulated in the original pipe, called the original transport stream,
- a module for obtaining a modified transport stream, obtained by replacing at least one main content, carried by the original transport stream, by at least one secondary content,
- a module for the time-shift of the original total stream,
- a module for aligning at least one reference packet of the modified transport stream with at least one reference packet of the original total stream obtained after time-shift, and
- a module for the replacement, in the original pipe of the original total stream obtained after time-shift, of the original transport stream by the modified transport stream obtained after alignment.

These modules can be driven by the microprocessor of the processing unit 52.

In particular, it can be noted that the processing unit 52 can also input at least one secondary content to be inserted in a transport stream of the original total stream or directly receive a modified transport stream, when the processing device cooperates with a content replacement equipment.

The invention claimed is:

1. A method for processing an original total stream delivering a modified total stream, said original total stream being sent out by a head-end and addressed to a plurality of broadcasting sites, and comprising at least one physical layer pipe encapsulating a transport stream, wherein said method comprises the following acts performed by a processing device:
   receiving said original total stream,
   for at least one physical layer pipe of the original total stream, called an original pipe:
      extracting the transport stream encapsulated in said original pipe, called an original transport stream,
      obtaining a modified transport stream obtained by replacing at least one main content carried by said original transport stream by at least one secondary content,
      time-shifting said original total stream,
      aligning at least one reference packet of said modified transport stream with at least one reference packet of said original total stream obtained after the time-shifting, and
      replacing, in the original pipe of said original total stream obtained after the time-shifting, said original transport stream by said modified transport stream obtained after the aligning.

2. The method for processing according to claim 1, wherein said original total stream and said modified total stream have an identical structure.

3. The method for processing according to claim 1, wherein said reference packets are signaling packets.

4. The method for processing according to claim 1, further comprising updating at least one check field in said modified total stream.

5. The method for processing according to claim 1, wherein the obtaining implements transmission of said original transport stream to a piece of equipment for replacing contents implementing the replacement of said at least one main content by said at least one secondary content, and reception of said modified transport stream.

6. The method for processing according to claim 5, wherein said replacement implements a replacement of at least one data packet associated with said main content by at least one data packet associated with said secondary content.

7. The method for processing according to claim 1, wherein the obtaining implements replacement of said at least one main content by said at least one secondary content.

8. The method for processing according to claim 7, wherein said replacement implements a replacement of at least one data packet associated with said main content by at least one data packet associated with said secondary content.

9. The method for processing according to claim 1, wherein said original total stream and said modified total stream are of a DVB-T2 Modulator Interface (T2-MI) type.

10. The method for processing according to claim 1, wherein the receiving, extracting, obtaining, time-shifting, aligning and replacing are implemented in one of said broadcasting sites.

11. A device for processing an original total stream delivering a modified total stream, said original total stream being sent out by a head-end and being addressed to a plurality of broadcasting sites, and comprising at least one physical layer pipe encapsulating a transport stream, wherein said device comprises:
   a processor; and
   a non-transitory computer-readable medium comprising instructions stored thereon, which when executed by the processor configure the processing device to perform acts comprising:
      receiving the original total steam,
      for at least one physical layer pipe of said original total stream, called an original pipe:
         extracting the transport stream encapsulated in said original pipe, called an original transport stream,
         obtaining a modified transport stream obtained by replacing at least one main content carried by said original transport stream by at least one secondary content,
         time-shifting said original total stream,
         aligning at least one reference packet of said modified transport stream with at least one reference packet of said original total stream obtained after the time-shifting, and
         replacing, in the original pipe of said original total stream obtained after the time-shifting, said original transport stream by said modified transport stream obtained after alignment.

12. A non-transitory computer-readable medium comprising a computer program stored thereon, which comprises instructions for implementing a method for processing an original total stream delivering a modified total stream, when this program is executed by a processor of a processing device, said original total stream being sent out by a head-end and addressed to a plurality of broadcasting sites, and comprising at least one physical layer pipe encapsulating a transport stream, wherein said method comprises the following acts performed by a processing device:

receiving said original total stream, for at least one physical layer pipe of the original total stream, called an original pipe:

extracting the transport stream encapsulated in said original pipe, called an original transport stream, obtaining a modified transport stream obtained by replacing at least one main content carried by said original transport stream by at least one secondary content, time-shifting said original total stream, aligning at least one reference packet of said modified transport stream with at least one reference packet of said original total stream obtained after the time-shifting, and replacing, in the original pipe of said original total stream obtained after the time-shifting, said original transport stream by said modified transport stream obtained after the aligning.

\* \* \* \* \*